US011952162B2

(12) United States Patent
Lopez

(10) Patent No.: US 11,952,162 B2
(45) Date of Patent: Apr. 9, 2024

(54) LABEL DISPENSER FOR PRODUCT-TRANSPORTING CARTS AT RETAIL FACILITIES

(71) Applicant: Walmart Apollo, LLC, Bentonville, AR (US)

(72) Inventor: Scott L. Lopez, Idaho Falls, ID (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/201,636

(22) Filed: May 24, 2023

(65) Prior Publication Data

US 2023/0294867 A1 Sep. 21, 2023

Related U.S. Application Data

(63) Continuation of application No. 17/336,010, filed on Jun. 1, 2021, now abandoned.

(Continued)

(51) Int. Cl.

*B65C 11/00* (2006.01)
*B65H 16/00* (2006.01)
*B65H 41/00* (2006.01)

(52) U.S. Cl.

CPC ............ *B65C 11/00* (2013.01); *B65H 16/005* (2013.01); *B65H 41/00* (2013.01); *B65C 2210/0078* (2013.01)

(58) Field of Classification Search

CPC .................. B65H 16/005; B65H 41/00; B65H 2301/4132; B65H 2301/41398;

(Continued)

(56) References Cited

U.S. PATENT DOCUMENTS 5,478,428 A 12/1995 Carpenter
5,570,809 A 11/1996 Martin (Continued)

OTHER PUBLICATIONS

CeilBlue; "Amazon.com: Pre-Cut Labels Dispenser 9.5"W x 7.5"D x 4.5"H: Industrial & Scientific"; <https://www.amazon.com/Pre-Cut-Labels-Dispenser-9-5-7-5/dp/B00T57SDUI>; available at least as early as Feb. 24, 2020; pp. 1-17.

(Continued)

*Primary Examiner* — Galen H Hauth
*Assistant Examiner* — Alexander S Wright
(74) *Attorney, Agent, or Firm* — Fitch, Even, Tabin & Flannery LLP

(57) ABSTRACT

A label dispenser coupled to product-transporting carts at retail facilities includes a label roll support arm supporting multiple label rolls thereon, a label guide arm including openings that permit a leading portion of the backing substrate of a label roll to pass therethrough, and a side wall interconnecting the label roll support arm and the label guide arm. The label guide arm also includes an upper portion located above the openings and configured to support the backing substrates of the label rolls thereon. The label guide arm further includes an edge configured to facilitate separation of a leading peelable label from the backing substrate in response to a force applied by the user when pulling the leading portion of the backing substrate of the label roll through the opening of the label guide arm.

20 Claims, 5 Drawing Sheets

Related U.S. Application Data

(60) Provisional application No. 63/033,096, filed on Jun. 1, 2020.

(58) Field of Classification Search
CPC .............. B65H 2405/422; B65H 29/54; B65H 35/002; B65H 2701/194; B65H 2701/19404; A47K 10/3836; B65C 11/00; B65C 2210/0078; B65C 2210/00
See application file for complete search history.

(56) References Cited

U.S. PATENT DOCUMENTS

| | | | | |
|---|---|---|---|---|
| 6,447,185 | B1 | 9/2002 | Kashiwaba | |
| 6,805,184 | B1 * | 10/2004 | Hsiu-Man ............ | B65H 37/002 221/311 |
| 8,568,046 | B2 * | 10/2013 | Campbell .............. | B65H 75/24 400/613 |
| 10,507,858 | B2 | 12/2019 | Bacallao | |
| 2018/0057033 | A1 | 3/2018 | Green | |
| 2021/0371149 | A1 | 12/2021 | Lopez | |

OTHER PUBLICATIONS

Take-a-Label; “Amazon.com: TAL-5M Manual Label Dispenser: Industrial & Scientific”; <https://www.amazon.com/Take-Label-TAL-5M-Manual-Dispenser/dp/B07KQNLWSS>; available at least as early as Feb. 24, 2020; pp. 1-7.

USPTO; U.S. Appl. No. 17/336,010; Notice of Allowance and Fees Due (PTOL-85) dated Feb. 27, 2023; (pp. 1-10).

* cited by examiner

LABEL DISPENSER FOR PRODUCT-TRANSPORTING CARTS AT RETAIL FACILITIES

CROSS-REFERENCE TO RELATED APPLICATIONS

This application is a continuation of U.S. nonprovisional application Ser. No. 17/336,010, filed Jun. 1, 2021, which claims the benefit of U.S. provisional App. No. 63/033,096, filed Jun. 1, 2020, each of which is incorporated herein by reference in its entirety.

TECHNICAL FIELD

This disclosure relates generally to label dispensers and, in particular, to multi-roll label dispensers for dispensing labels to be attached to product packaging at retail facilities.

BACKGROUND

Retail facility workers routinely attach labels to product packaging such as boxes, totes, and the like. In addition, it is common for workers to transport products, boxes, and totes using product-transporting carts referred to as either order filling carts or picking carts.

During order fulfillment (e.g., online order fulfillment), the workers are often tasked with placing labels on product packaging to identify specific handling instructions (e.g., fragile, heavy, refrigerated, frozen, etc.) for certain products. This task is typically performed by a worker having several label rolls or several label roll dispensers on the cart and interchangeably hand-picking a label roll or a label dispenser as appropriate for a given package, peeling off a label from the selected label roll, placing the peeled label on the package, and then placing the label roll back or dispenser back onto the cart.

If four different types of labels need to be distributed by the worker among the packages, the worker would have to interchangeably pick up and put down four different label rolls and peel labels therefrom, which is not efficient. A more efficient solution that overcomes this issue is needed.

BRIEF DESCRIPTION OF THE DRAWINGS

Disclosed herein are embodiments of systems and apparatuses pertaining to label roll dispensers for dispensing labels from one or more label rolls. This description includes drawings, wherein.

Figure 1:
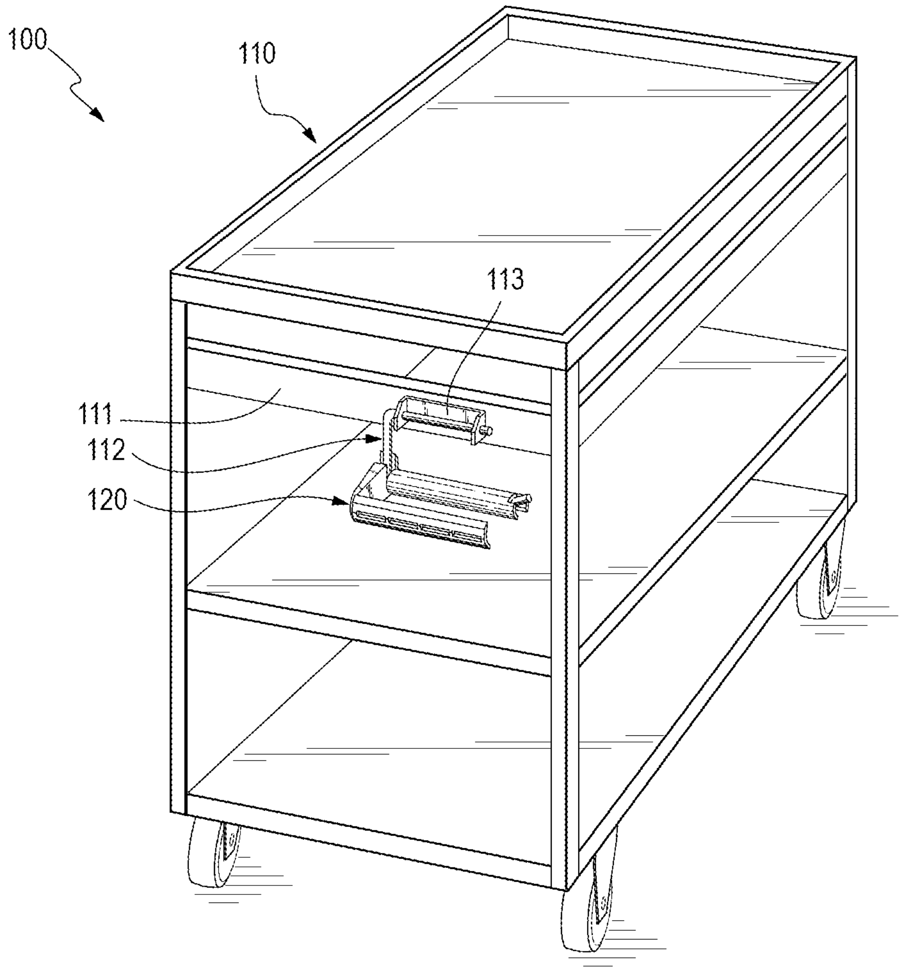
FIG. 1 is a perspective view of a label dispenser according to some embodiments coupled to an exemplary product-transporting cart.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, a multi-label roll label dispenser that may be coupled to a product-transporting cart or another support surface to facilitate a worker at a retail facility in efficiently dispensing labels from different label rolls and attaching the labels to product packaging.

In one embodiment, a system for dispensing labels from at least one label roll includes a cart for transporting consumer products, the cart including a support bar coupled thereto and a label dispenser mounted on the support bar and configured to facilitate a user to dispense the labels from the at least one label roll. The at least one label roll includes a backing substrate and peelable labels detachably attached to the backing substrate. The label dispenser includes a label roll support arm configured to support at least one label roll thereon, the label roll support arm including a hollow interior configured to permit a horizontal portion of the support bar to pass therethrough and a notch configured to permit an inclined distal portion of the support bar to pass therethrough. The label dispenser further includes a label guide arm including an upper portion configured to support a downward-facing surface of the backing substrate of the at least one label roll thereon and a lower portion. The lower portion of the label guide arm of the label dispenser includes at least one opening configured to permit a leading portion of the backing substrate of the at least one label roll to pass therethrough. The label guide arm of the label dispenser further includes an edge configured to facilitate separation of a leading peelable label of the at least one label roll from an outward-facing surface of the backing substrate at the leading portion of the backing substrate of the at least one label roll in response to a force applied by the user to the leading portion of the backing substrate of the at least one label roll pull the leading portion of the backing substrate of the at least one label roll through the at least one opening of the label guide arm. The label dispenser includes a side wall interconnecting the label roll support arm and the label guide arm. The side wall includes a gap permitting a vertical portion of the support bar to pass therethrough.

FIG. 1 shows an embodiment of a system 100 for dispensing labels 195 from one or more label rolls 190. The exemplary system 100 in FIG. 1 includes a label dispenser 120 coupled to a cart 110 that may be used by workers of retail facilities for transporting consumer products (e.g., non-consumable goods such as glassware and consumable goods such as grocery items) that are typically offered for sale to consumers at retail facilities. As used herein, the term "retail facility" may refer to any place of business such as a store, warehouse, sorting facility, and/or distribution facility where consumer products may be stocked, and/or sold, and/or shipped to, and/or shipped from.

The label dispenser 120 may be manufactured from various materials including but not limited to one or more polymers, co-polymers, and/or plastic materials. In some embodiments, the label dispenser 120 is made using a manufactured mold or from a 3D model using a 3D printer. In some aspects, the label dispenser 120 may have a general overall length about 150 mm and a general overall width of about 70 mm.

In the embodiment illustrated in FIG. 1, the label dispenser 120 is detachably coupled to the cart 110 via a support bar 112, which in turn is fixedly (i.e., non-detachably) mounted to a support surface 111 (e.g., a panel) of the cart 110. The term "non-detachably" will be understood to be an attachment that is not meant to be detached. In particular, as can be seen in FIG. 1, the support bar 112 is mounted to the support surface 111 of the cart 110 via a bracket 113, which may be fixedly attached to the support surface 111 by any suitable means, including but not limited to welding, fasteners and the like. The support bar 112 may in turn be fixedly attached to the bracket 113 by welding, one or more threaded nuts, or other suitable means.

While the label dispenser 120 is shown in FIG. 1 as being coupled to the cart 110, it will be appreciated that the label dispenser may be coupled to a support bar mounted to any suitable stationary support structure, for example, a wall, a shelf, or a cabinet. It will also be appreciated that, in certain implementations, the label dispenser 120 may be coupled to a portable (e.g., hand-held) device (which may include a support bar akin to the support bar 112) that would allow the worker to carry the label dispenser 120 independently of the cart 110.

Figure 3:
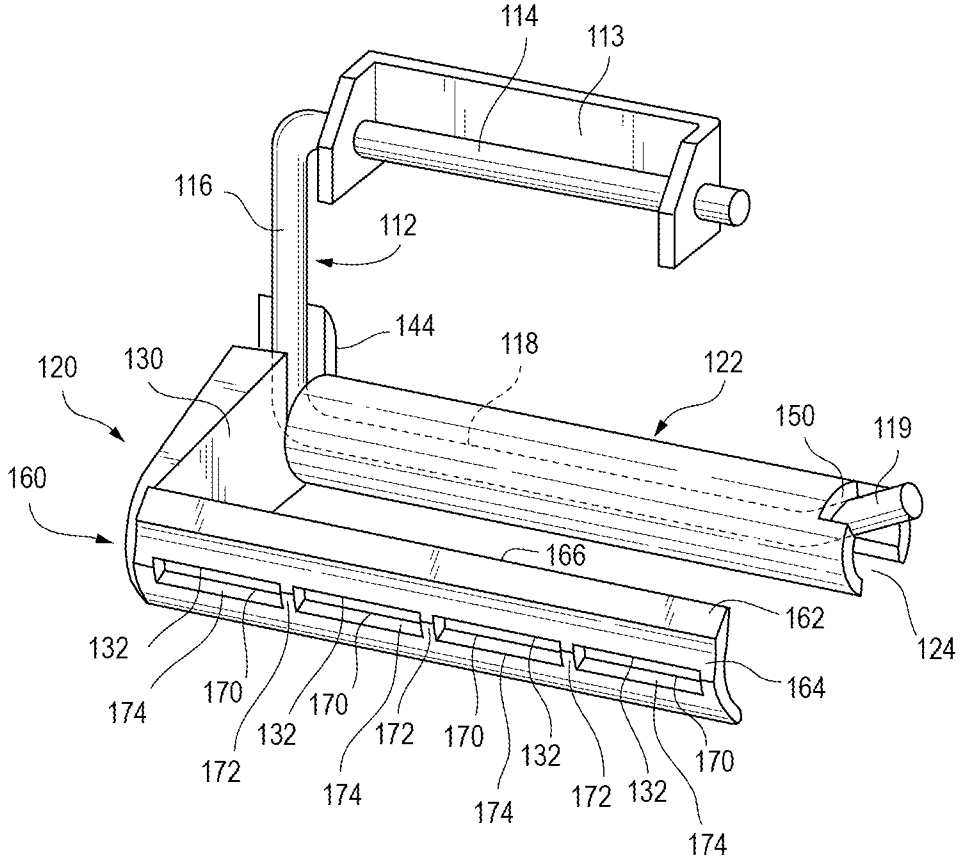
FIG. 3 is an enlarged front perspective view showing in more detail how the label dispenser of FIG. 1 is mounted to the support bar of the product-transporting cart of FIG. 1.

With reference to FIGS. 1 and 3, the exemplary support bar 112 is generally U-shaped and has a first horizontal portion 114 that is attached to the bracket 113, a vertical portion 116 extending generally downwardly from, and generally perpendicularly to the horizontal portion 114. The support bar 112 also includes a second horizontal portion 118 extending generally perpendicularly to the vertical portion 116 and generally in parallel to the first horizontal portion 114. As can be seen in FIG. 3, the horizontal portion 118 of the support bar 112 supports the label dispenser 120 thereon. FIG. 3 also shows that the support bar 112 has a distal portion 119 that is angled upwardly (i.e., forming an incline) relative to the horizontal portion 118 of the support bar 112. Without wishing to be limited to theory, the inclined distal portion 119 of the support bar 112 may prevent/restrict the label dispenser 120 from sliding off the support bar 112 and may also prevent/restrict the label rolls 190 from sliding off the label dispenser 120.

The illustrated label dispenser 120 includes a label roll support arm 122, which is generally in the shape of an elongated cylinder to permit one or more label rolls 190 to be supported and freely rotate thereon. In the illustrated embodiment, the label roll support arm 122 has a hollow interior 124 sized and shaped to permit the horizontal portion 118 of the support bar 112 of the cart 110 to pass therethrough, such that the label dispenser 120 is fully supported by the support bar 112 alone, with the label roll support arm 122 resting on it, as shown in FIG. 3.

Figure 4:
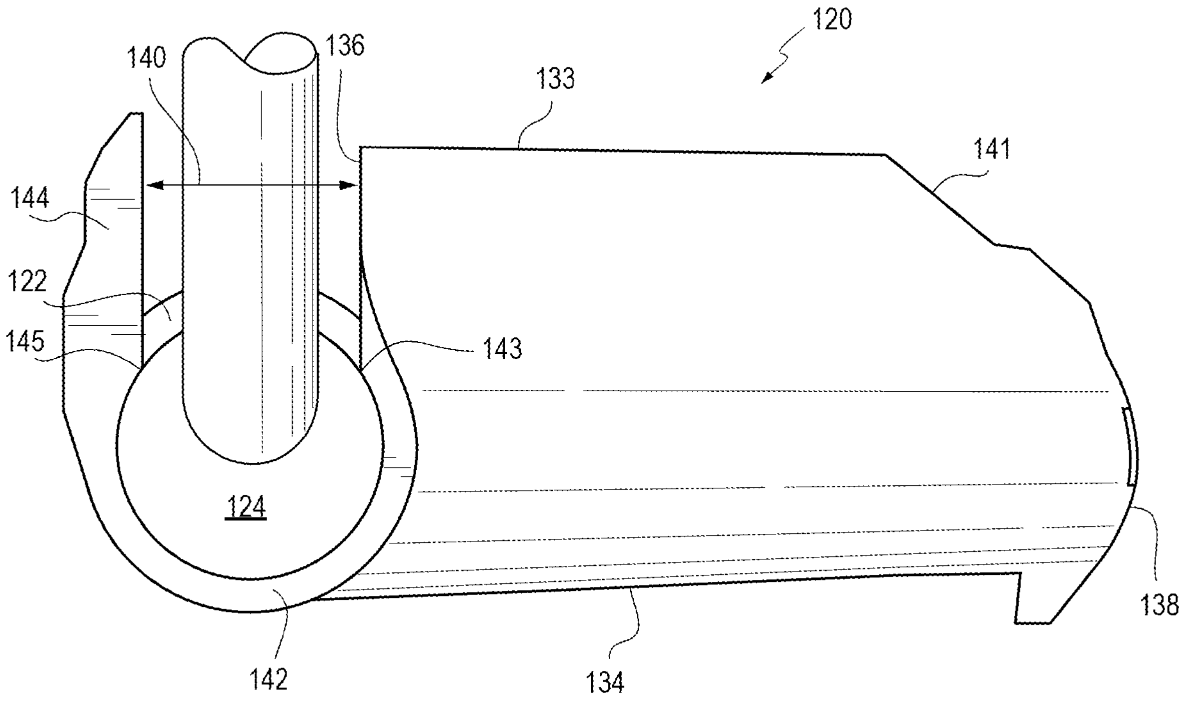
FIG. 4 is an end elevational view of the label dispenser of FIG. 3.

The label dispenser 120 also includes a side wall 130 attached to the label roll support arm 122 and interconnecting the label roll support arm 122 and a label guide arm 160 of the label dispenser 120, which will be discussed in more detail below. With reference to FIG. 4, the side wall 130 of the label dispenser 120 includes a top edge 133, a bottom edge 134 opposite the top edge 133, a rear edge 136, and a front edge 138. The top edge 133 and bottom edge 134 of the side wall 130 of the exemplary label dispenser 120 may be horizontal or angled to give the side wall 130 a generally forwardly wedged contour. The exemplary side wall 130 has a rear edge 136 that is generally vertical and generally perpendicular to the top edge 133 and to the bottom edge 134. The front edge 138 of the side wall 130 is generally arcuate from its top end to its bottom end with the front end of the top edge 133 and the top end of the front edge 138 being interconnected by a linear portion 141 that is sloped downwardly in a direction from the front end of the top edge 133 to the top end of the front edge 138.

In the illustrated embodiment, the side wall 130 is configured to include a generally U-shaped gap 140. In particular, as can be seen in FIG. 4, the U-shaped gap 140 is defined by: (1) the interior-facing surface of the generally vertical rear edge 136 of the side wall 130; (2) the interior-facing surface of a generally C-shaped arcuate (having a radius of curvature complementary to the support bar 112) rib 142 having opposite ends 143 and 145 and extending from the bottom end of the vertical rear edge 136; and (3) the interior-facing surface of a generally vertical arm 144 of the side wall 130 that extends generally upwardly from the end 145 of the rib 142 generally in parallel to the rear edge 136 of the side wall 130.

In the illustrated embodiment, a part of the vertical portion 116 of the support bar 112 and a part of the horizontal portion 118 of the support bar 112 pass through the gap 140 in the side wall 130. In particular, as can be seen in FIGS. 3 and 4, when a part of the horizontal portion 118 of the support bar 112 passes through the interior-facing surface of the C-shaped rib 142 and the vertical portion 116 of the support bar 112 is positioned in the gap 140 of the side wall 130 of the label dispenser 120, the circumference of the vertical portion 116 of the support bar 112 is located between, and, preferably, in abutment with, both the interior-facing surface of the rear edge 136 of the side wall 130 and the interior-facing surface of the vertical arm 144 of the side wall 130. This configuration, in combination with a notch 150 in the label roll support arm 122 (which will be discussed in more detail below), locks the vertical portion

116 of the support bar 112 in place and prevents/restricts the label dispenser 120 from rotating relative to the support bar 112.

Figure 2:
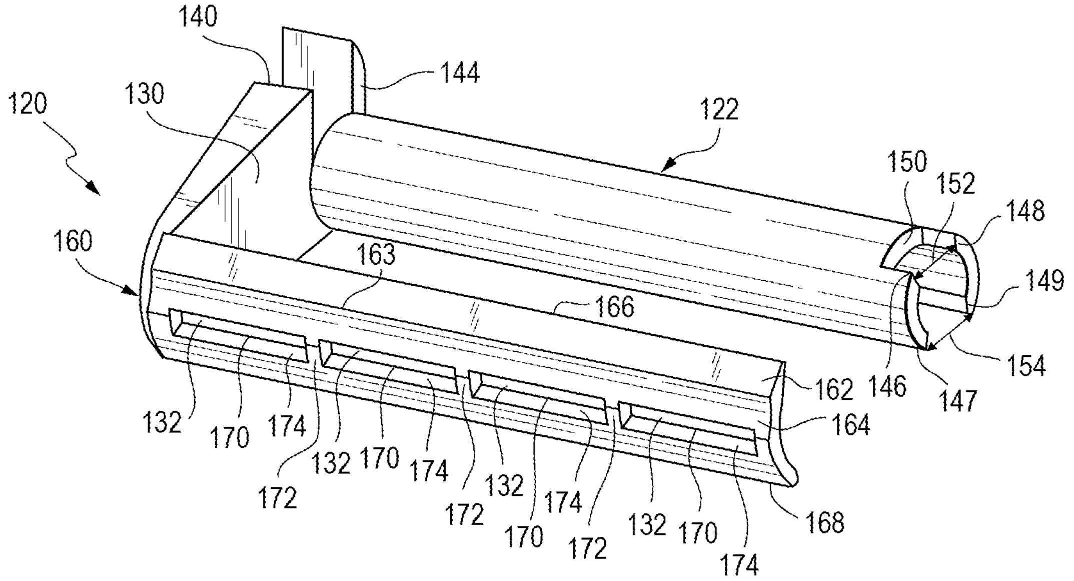
FIG. 2 is an enlarged front perspective view of the label dispenser of FIG. 1.

With reference to FIG. 3, at its distal end relative to the side wall 130, the label roll support arm 122 of the label dispenser 120 includes a notch 150. As can be seen in FIG. 2, the notch 128 is generally U-shaped, and creates top free ends 146 and 148 of the circumference of the label roll support arm 122 having a gap 152 therebetween. As can be seen in FIG. 3, this gap 152 created by the notch 150 in the label roll support arm 122 permits the inclined distal portion 119 of the support bar 112 to pass therethrough and rotationally interlock the support bar 112 and the label roll support arm 122. In particular, as shown in FIG. 3, the distal portion 119 of the support bar 112 passes through and protrudes from the gap 152 formed by the notch 150 and is located adjacent to (or may be in contact with) the top free ends 146 and 148 of the circumference of the label roll support arm 122.

With the distal portion 119 of the support bar 112 being located at least in part in the gap 152 formed by the notch 150, forward rotation of the label roll support arm 122 is prevented/restricted by the abutment of the top free end 146 of the circumference of the label roll support arm 122 and one side of the distal portion 119 of the support bar 112. By the same token, rearward rotation of the label roll support arm 122 is prevented/restricted by the abutment of the top free end 148 of the circumference of the label roll support arm 122 and the opposite side of the distal portion 119 of the support bar 112. As such, the passage of the distal portion 119 of the support bar 112 through the notch 150 of the label roll support arm 122 advantageously locks the label roll support arm 122 in place, preventing the label roll support arm 122 from inadvertently rotating when a user (e.g., a worker at a retail facility) pulls downwardly on the backing substrate 192 of the label rolls 190 to dispense one or more labels 195 from the label rolls 190.

In the illustrated embodiment, the label roll support arm 122 has an incomplete (generally C-shaped) circumference, with a portion of the circumference that would have been downward-facing being absent. As such, the bottom free ends 147 and 149 of the circumference of the label roll support arm 122 have a gap 154 therebetween. The hollow interior 124 of the label roll support arm 122, coupled with the label roll support arm 122 having the gap 154 in its circumference, permit the label dispenser 120 (e.g., when including four label rolls 190 fully stocked with labels 195) to be easily slid onto the support bar 112 and to be easily slid off the support bar 112 (e.g., to replace labels rolls 190 no longer having any labels 195 with new label rolls 190 that are fully stocked with labels 195).

With reference to FIG. 3, the label dispenser 120 may be slid onto the support bar 112 by inserting the distal portion 119 and a part of the horizontal portion 118 of the support bar 112 through the gap 140 in the side wall 130 of the label dispenser 120 and into the hollow interior 124 of the label roll support arm 122. After the distal portion 119 and a part of the horizontal portion 118 of the support bar 112 are inserted through the gap 140 in the side wall 130 into the hollow interior 124 of the label roll support arm 122, the distal portion 119 of the support bar 112 may be slid along almost the entire length of the hollow interior 124 of the label roll support arm 122 until the distal portion 119 of the support bar 112 passes through the notch 150 and at least in part protrudes outwardly and generally upwardly from the hollow interior 124 of the label roll support arm 122, as shown in FIG. 3.

Since the outer circumference of the support bar 112 and the inner circumference of the label roll support arm 122 are substantially similar in size, and since the distal portion 119 of the support bar 112 is inclined relative to the horizontal portion 118 of the support bar 112, the gap 154 in the circumference of the label roll support arm 122 facilitates the insertion of the support bar 112 into the hollow interior 124 of the label roll support arm 122. In particular, when the distal portion 119 of the support bar 112 is inserted into the hollow interior 124 of the label roll support arm 122, at least the distal portion 119 of the support bar 112 (and, possibly, a part of the horizontal portion 118 of the support bar 112) is permitted to pass through the gap 154 in the circumference of the label roll support arm 122. Conversely, given the relative dimensions of the support bar 112 and the hollow interior 124 of the label roll support arm 122, if the gap 154 were absent such that the label roll support arm 122 had a complete circumference, it would have been difficult to insert the horizontal and distal portions of the support bar 112, which are angled relative each other, into the generally cylindrical-shaped hollow interior 124 of the label roll support arm 122 if the label roll support arm 122 had a complete circumference and lacked the gap 154.

Figure 5:
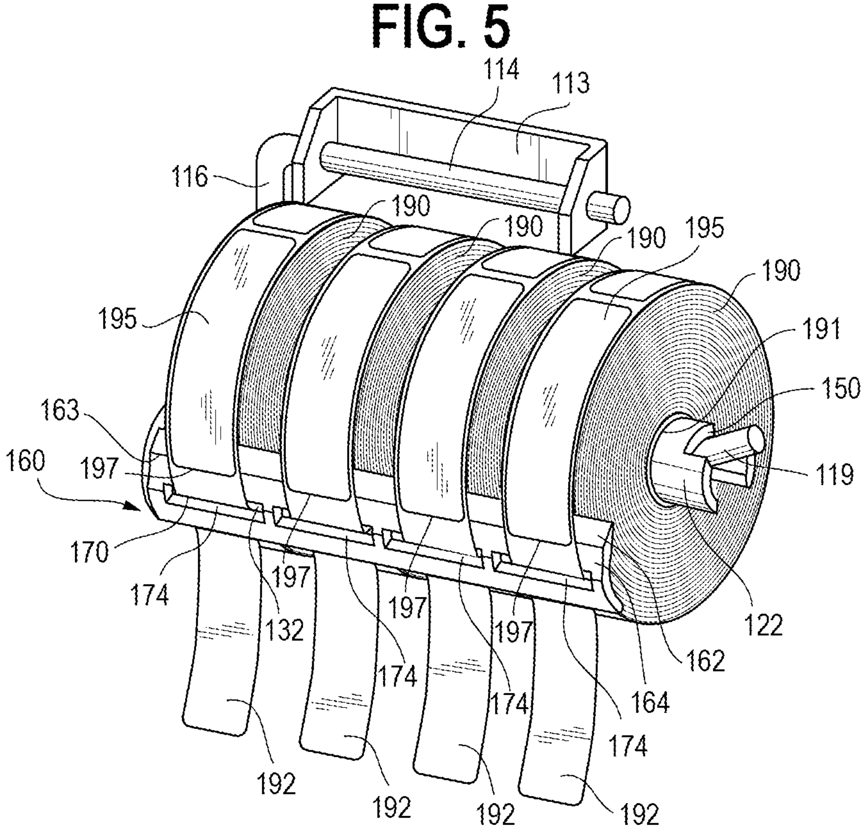
FIG. 5 is the same view as in FIG. 3, but showing the label dispenser with four label rolls thereon.

In the exemplary embodiment illustrated in FIG. 5, the label roll support arm 122 has a length that is sufficient to support four label rolls 190 thereon. It will be appreciated that the label roll support arm 122 may be longer in certain implementations to accommodate more than four label rolls 190, and may be shorter in certain implementations to accommodate fewer than four label rolls 190.

With reference to FIG. 5, a typical label roll 190 includes a backing substrate 192. The backing substrate 192 includes an outward-facing surface having labels 195 removably attached thereto by an adhesive that permits the labels 195 to be peeled by a user from the backing substrate 192. An individual label 195 of a label roll 190 may include one side (visible in FIG. 5) having printed indicia (e.g., Fragile, Refrigerate, Keep Frozen, Heavy, Alcohol, Substitution, etc.) and/or a certain color (e.g., red, green, yellow, black, etc.) thereon, and an opposite side (not visible in FIG. 5 but visible in FIG. 8) having an adhesive material thereon that permits the label 195 to be detachably attached to the backing substrate 192 and, after being peeled from the backing substrate 192 of the label roll 190 by a user, to be attached to an exterior surface of the packaging of a consumer product or to a box/tote used for transporting the consumer product.

In the illustrated embodiment, the label dispenser 120 includes a label guide arm 160 for facilitating the separation of the labels 195 of the label rolls 190 from the backing substrates 192 of the label rolls 190. In the illustrated embodiment, the label guide arm 160 includes an upper portion 162 and a lower portion 164. While the lower portion 164 has been illustrated as having a generally arcuate shape and the upper portion 162 has been illustrated as being in the shape of a straight line that is not co-linear with the arc of curvature of the lower portion 164, it will be appreciated that the shape of the various features of the label dispenser 120 has been shown by way of example only, and that other shapes may be used in alternative embodiments.

With reference to FIG. 3, the lower portion 164 of the label guide arm 160 includes four openings 132. Each of the openings 132 is generally rectangular in shape and has an overall height and width that is sufficient to permit a leading portion of the backing substrate 192 of a label roll 190 to pass therethrough. In the illustrated embodiment, openings 132 that are located adjacent to one another are separated from each other by a rib 172, with the rib 172 defining one side of the perimeter of such openings 132. The lower portion 164 of the label guide arm 160 includes a free edge 170 located below each opening 132, such that the free edge 170 defines a bottom side of the perimeter of each opening 132.

Located between the ribs 172 and recessed relative to the forward-facing surface of the lower portion 164 of the label guide arm 160 is a sloped surface 174 that extends forwardly and downwardly from the free edge 170. As described in more detail below, in some embodiments, the free edge 170 of the lower portion 164 of the label guide arm 160 facilitates separation of a leading edge 197 of a leading peelable label 195 of the label roll 190 from the outward-facing surface of the backing substrate 192 when a user pulls the backing substrate 192 in a downward direction through the opening 132 of the lower portion 164 of the label guide arm 160. To that end, in the illustrated embodiment, the sloped surface 174 extending between the ribs 172 and forwardly/downwardly from the free edge 170 is a straight, non-curved surface, creating an effect akin to a razor's edge that both separates the label 195 from the backing substrate 192 and guides the label 195 in a direction away from the backing substrate 192. However, it will be appreciated that the sloped surface 174 may not be in the shape of a single straight line in some embodiments, and may include a curved portion or may be in the form of two straight lines that are at different angles relative to a horizontal plane.

As mentioned above, FIG. 5 illustrates a label dispenser 120 mounted on a support bar 112 (which is in turn mounted to a cart 110 or another support structure via a bracket 113) and having four label rolls 190 thereon. In particular, as can be seen in FIG. 5, each of the label rolls 190 includes a generally circular inner opening 191 defined by the inwardly-facing surface of the backing substrate 192. The opening 191 of each label roll 190 has a diameter that is substantially similar but slightly larger than the diameter of the label roll support arm 122 of the label dispenser 120 and permits a user to slide the label rolls 190 onto (and off) the label roll support arm 122 of the label dispenser 120. After the label rolls 190 are slid by a user onto the label roll support arm 122, to bring the label rolls 190 into their initial label dispensing position, the backing substrate 192 of each label roll 190 is pulled by the worker over the upper portion 162 of the label guide arm 160 and into a respective one of the openings 132 of the lower portion 164 of the label guide arm 160, as shown in FIG. 5. With the label rolls 190 being on the label dispenser 120 as shown in FIG. 5, the labels 195 of any one of the label rolls 190 may be dispensed (i.e., separated from the backing substrate 192) as described below.

Figure 6:
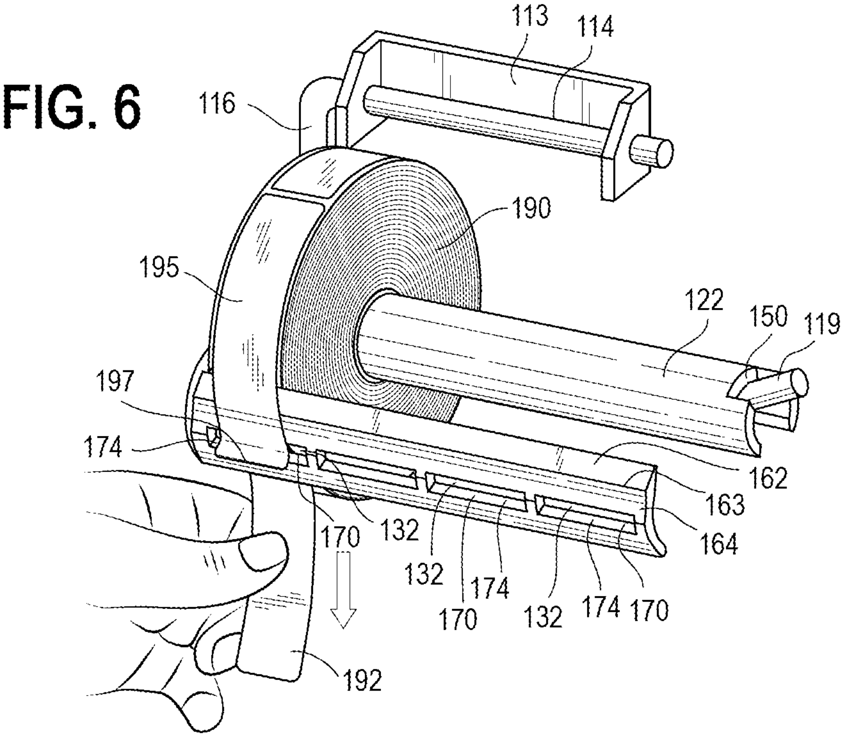
FIG. 6 is the same view as in FIG. 5, but showing only one label roll on the label dispenser and showing a hand of a user pulling the leading portion of the backing substrate of the label roll through the opening in the label dispenser in the direction shown by the arrow to initiate the separation of the label from the backing substrate of the label roll.

In particular, with the label rolls 190 being in their initial dispensing position on the label dispenser 120 as shown in FIG. 5, a user wishing to dispense a label 195 from any one of the label rolls 190 would grasp the leading portion of the backing substrate 192, i.e., the portion of the backing substrate 192 not having a label thereon and hanging below the lower portion 164 of the label guide arm 160, as shown in FIG. 6. After grasping the leading portion of the backing substrate 192, the user would pull the leading portion of the backing substrate 192 in a generally downward direction shown by the arrow in FIG. 6.

The generally downward force applied by the user to the leading portion of the backing substrate 192 causes the label roll 190 to rotate. The rotation of the label roll 190 on the label roll support arm 122 is permitted, since the label roll support arm 122 and the inner opening 191 of the label roll 190 are both generally circular, and since the label roll 190 is not attached to the label roll support arm 122 by an adhesive.

Notably, if the rotation of the label roll 190 that occurs in response to the application of the downward force by the user were to cause a corresponding forward rotation of the label roll support arm 122, the mutual rotation of the label roll 190 and the label roll support arm 122 would not create the friction that is necessary to unwind the backing substrate 192 from the label roll 190. In the illustrated embodiments, however, the forward rotation of the label roll 190 that occurs in response to the application of the downward force by the user does not cause a corresponding forward rotation of the label roll support arm 122 since, as described below, the forward (and rearward) rotation of the label roll support arm 122 is advantageously restricted by the distal portion 119 of the support bar 112 passing through the notch 150 of the label roll support arm 122 and being interlocked in the gap 152 between the top free ends 146 and 148 of the circumference of the label roll support arm 122.

As described above, the forward (and rearward) rotation of the label roll support arm 122 is additionally advantageously restricted by the vertical portion 116 of the support bar 112 being interlocked in the gap 140 between the interior-facing surface of the rear edge 136 of the side wall 130 and the interior-facing surface of the vertical arm 144 of the side wall 130. As such, the label roll support arm 122 remains in place and does not rotate during the rotation of the label roll 190 that occurs in response to the application of the downward force by the user, and the friction between the inward-facing surface of the backing substrate 192 of the label roll 190 and the circumference of the label roll support arm 122 permits the label roll 190 to rotate forwardly independently of the label roll support arm 122 and to permit the backing substrate 192 to be unwound from the label roll 190.

With reference to FIG. 6, while the user pulls the backing substrate 192 of the label roll 190 downwardly, more and more of the backing substrate 192 unwinds from the label roll 190 and passes through the opening 132 in the lower portion 164 of the label guide arm 160 until the leading edge 197 of the leading label 195 of the label roll 190 comes into abutment with the free edge 170 of the lower portion 164 of the label guide arm 160. Then, with the user is still pulling the backing substrate 192 generally downwardly, the backing substrate 192 continues to unwind from the label roll 190 and the leading edge 197 is pulled against the free edge 170 of the lower portion 164 of the label guide arm 160, such that the free edge 170, due to its thin profile, is able to get in-between the leading edge 197 of the label 195 and the outwardly-facing surface of the backing substrate 192, and slide under the leading edge 197 of the label 195 to initiate the separation of the adhesive downward-facing surface 199 of the label 195 from the outwardly-facing surface of the backing substrate 192, as shown in FIG. 6.

As discussed above, the label guide arm 160 includes a lower portion 164 having a generally arcuate contour and an upper portion 162 in the shape of a straight line that is not co-linear with the arc of curvature of the lower portion 164. As a result, the label guide arm 160 includes an edge 163 at the transition between the lowermost surface of the upper portion 162 and the uppermost surface of the lower portion 164. As can be seen in FIGS. 5-8, this edge 163 is located above the opening 132 through which the backing substrate 192 is fed.

In some embodiments, as the user pulls the backing substrate 192 of the label roll 190 downwardly, more and more of the backing substrate 192 unwinds from the label roll 190 and slides over the surface of the linear upper portion 162 of the label guide arm 160 until the backing substrate 192 slides over the edge 163 between the upper portion 162 and the lower portion 164. In one aspect, as more and more of the backing substrate 192 is pulled through the opening 132, the initial separation of the leading edge 197 of the label 195 from the outwardly-facing surface of the backing substrate 192 does not occur at the free edge 170 defining the bottom side of the perimeter of the opening 132, but occurs at the edge 163 located above the opening 132, due to the different angular orientations of the linear upper portion 162 and the arcuate lower portion 164 of the label guide arm 160.

After the separation of the leading edge 197 of the label 195 from the backing substrate 192 is initiated, the sloped surface 174 of the lower portion 164 of the label guide arm 160 guides the downward-facing adhesive surface 199 of the label 195 to slide over it, which facilitates the spatial separation between the label 195 and the backing substrate 192. In other words, as the user continues to pull the backing substrate 192 of the label roll 190 generally downwardly/forwardly, more and more of the backing substrate 192 unwinds from the label roll 190 and passes through the opening 132 in the lower portion 164 of the label guide arm 160, and more and more of the label 195 separates from the backing substrate 192 by arcuate surface of the lower portion 164 (located between the edge 163 and the upper perimeter of the opening 132) guiding the portion of the label 195 separated from the backing substrate 192 in a direction away from the backing substrate 192, as shown in FIG. 7.

Figure 7:
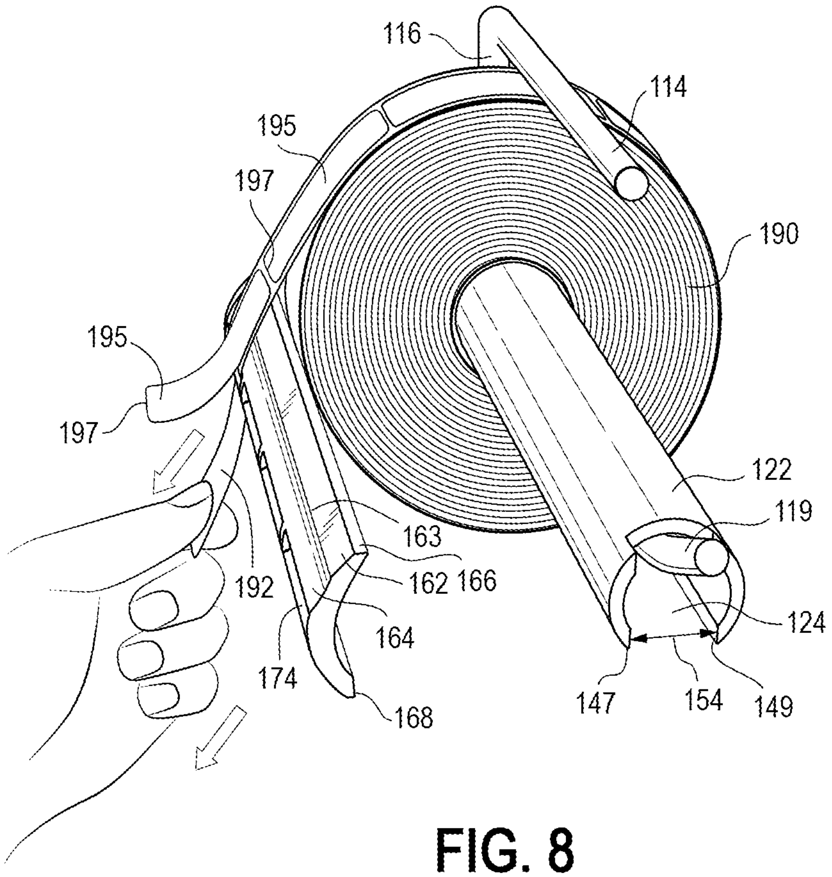
FIG. 7 is a side perspective view of the label dispenser of FIG. 6, shown with the leading portion of the backing substrate of the label roll having been pulled further down by the hand of the user than in FIG. 6 to separate more of the label from the from the backing substrate as compared to FIG. 6.
Figure 8:
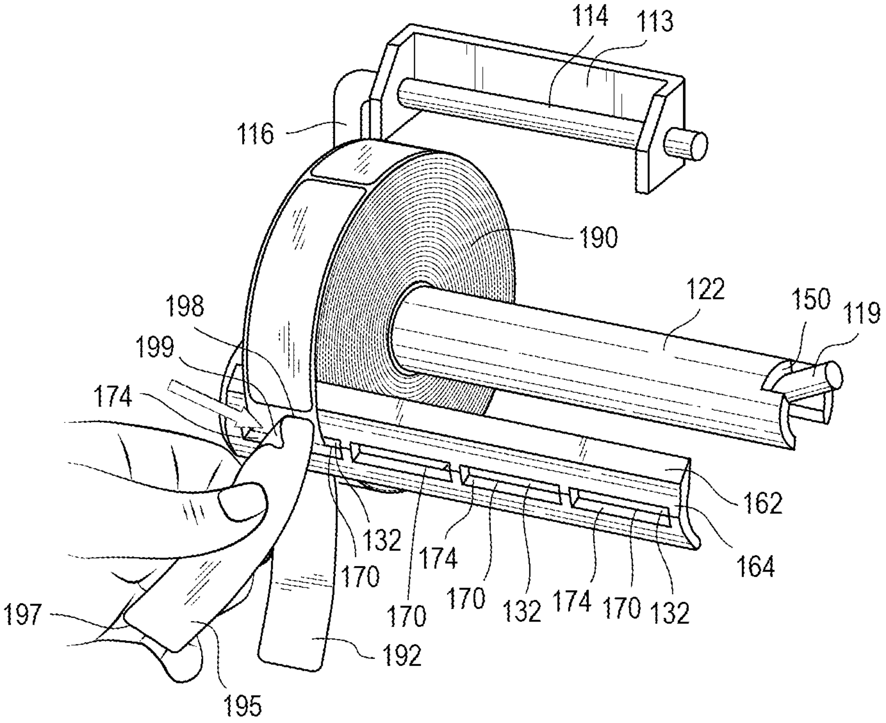
FIG. 8 is a front perspective view of the label dispenser, shown with the label having been fully separated from the backing substrate, and with the label being pulled in the direction of the arrow to detach the trailing end of the label from the body of the label dispenser.

With reference to FIGS. 7 and 8, as the user continues to pull the backing substrate 192 of the label roll 190 generally in a downward/forward direction relative to the position of the backing substrate 192 shown in FIG. 7, a more and more of the backing substrate 192 unwinds from the label roll 190 and passes through the opening 132 in the lower portion 164 of the label guide arm 160, and as more and more of the label 195 separates from the backing substrate 192, the label 195 will fully separate from the backing substrate 192. However, the label 195 does not simply fall onto the floor after being fully separated from the backing substrate 192. Instead, due to the arcuate surface of the lower portion 164 of the label guide arm 160 guiding the portion of the label 195 being separated from the backing substrate 192, a portion of the adhesive surface 199 of the label 195 proximate the trailing edge 198 of the label 195 remains attached to the lower portion 164 of the label guide arm 160 as shown in FIG. 8, permitting the user to conveniently detach the label 195 from the lower portion 164 of the label guide arm 160 by peeling the label 195 in the direction shown by the arrow in FIG. 8. After the leading label 195 is detached from the label roll 190, the user can detach more labels 195 from any of the label rolls 190 by repeating the process described above with reference to FIGS. 6-8

In view of the foregoing, the present application describes label dispensers that may support several label rolls thereon, and which are mountable to product-transporting carts at retail facilities to improve the efficiency of the process of applying various labels to consumer products and product packaging/shipping containers by the workers of the retail facilities. The increase in worker efficiency provided by the label dispensers described herein will result in a significant operation cost savings to the retailers.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for dispensing labels from at least one label roll, the system comprising:

a support bar; and a label dispenser mounted on the support bar and configured to facilitate a user to dispense the labels from the at least one label roll, the at least one label roll including a backing substrate and peelable labels detachably attached to the backing substrate, the label dispenser comprising:

a label roll support arm configured to support at least one label roll thereon, the label roll support arm including:

a hollow interior configured to permit a horizontal portion of the support bar to pass therethrough; and a notch configured to permit an inclined distal portion of the support bar to pass therethrough; and a label guide arm including an edge configured to facilitate separation of a leading peelable label of the at least one label roll from an outward-facing surface of the backing substrate at a leading portion of the backing substrate of the at least one label roll in response to a force applied by the user to the leading portion of the backing substrate of the at least one label roll to pull the leading portion of the backing substrate of the at least one label roll through the at least one opening of the label guide arm; and a side wall interconnecting the label roll support arm and the label guide arm, the side wall including a gap that permits a vertical portion of the support bar to pass therethrough.

2. The system of claim 1, wherein:

the support bar is non-detachably mounted relative to the cart; and the label dispenser is detachably coupled relative to the cart via the support bar.

3. The system of claim 1, further comprising a bracket non-detachably coupled to the cart, wherein the support bar is non-detachably coupled to the support bracket.

4. The system of claim 1, wherein the inclined distal portion of the support bar passing through the notch in the label roll support arm is configured to:

restrict the label dispenser from sliding off the support bar; and restrict the at least one label roll from sliding off the label roll support arm.

5. The system of claim 1, wherein the label roll support arm is configured as an elongated cylinder that permits the at least one label roll to freely rotate on the label roll support arm.

6. The system of claim 5, wherein the elongated cylinder has an incomplete perimeter such that a portion of a circumference of the elongated cylinder is absent to create two opposing top free ends of the circumference and two opposing bottom free ends of the circumference, the top free ends having a first gap therebetween and the bottom free ends having a second gap therebetween.

7. The system of claim 6, wherein:

the inclined distal portion of the support bar passing through the notch passes through the first gap between the top free ends;

forward rotation of the label roll support arm is restricted by an abutment of one of the top free ends and a first side of the support bar; and rearward rotation of the label roll support arm is restricted by an abutment of another one of the top free ends and a second side of the support bar opposite to the first side.

8. The system of claim 1, wherein the side wall of the label guide arm includes a top edge, a bottom edge opposite the top edge, a rear edge, and a front edge, wherein:

the front edge is generally arcuate from a top end of the front edge to a bottom end of the front edge, and the top edge of the side wall is interconnected with the top end of the front edge by a linear portion that slopes downwardly from the top edge of the side wall in a direction toward the top end of the front edge of the side wall.

9. The system of claim 1, wherein the gap in the side wall is defined by:

an interiorly-facing surface of a generally vertical rear edge of the side wall;

an interiorly-facing surface of a generally C-shaped arcuate rib having opposite ends; and an interiorly-facing surface of a generally vertical arm of the side wall, the generally vertical arm extending generally upwardly from one of the ends of the C-shaped arcuate rib in a direction that is generally parallel to the rear edge of the side wall.

10. The system of claim 9, wherein the horizontal portion of the support bar passes through an interior-facing surface of the C-shaped arcuate rib, and wherein the vertical portion of the support bar is positioned in abutment with both the interiorly-facing surface of the rear edge of the side wall and the interiorly-facing surface of the vertical arm of the side wall to restrict the label dispenser from rotating relative to the support bar.

11. The system of claim 1, wherein, a lower portion of the label guide arm is generally arcuate and an upper portion of the label guide arm is a straight and not co-linear with an arc of curvature of the lower portion.

12. The system of claim 1, wherein the at least one opening is a plurality of openings, wherein adjacent openings are separated from each other by a rib that defines one side of a perimeter of the adjacent openings, and wherein the edge is located below each opening such that the edge defines a bottom side of the perimeter of each opening.

13. The system of claim 1, wherein the label guide arm further includes a sloped surface that is located between ribs separating the adjacent openings and that extends forwardly and downwardly relative to the edge that defines the bottom side of the perimeter of each opening.

14. A method for dispensing labels from at least one label roll, the method comprising:

providing a label dispenser mounted on a support bar and configured to facilitate a user to dispense the labels from the at least one label roll, the at least one label roll including a backing substrate and peelable labels detachably attached to the backing substrate, the label dispenser comprising:

a label roll support arm configured to support at least one label roll thereon, the label roll support arm including:

a hollow interior configured to permit a horizontal portion of the support bar to pass therethrough; and a notch configured to permit an inclined distal portion of the support bar to pass therethrough; and a label guide arm including an edge configured to facilitate separation of a leading peelable label of the at least one label roll from an outward-facing surface of the backing substrate at the leading portion of the backing substrate of the at least one label roll; and a side wall interconnecting the label roll support arm and the label guide arm, the side wall including a gap that permits a vertical portion of the support bar to pass therethrough;

in response to a force applied by the user to the leading portion of the backing substrate of the at least one label roll to pull the leading portion of the backing substrate of the at least one label roll through the at least one opening of the label guide arm, separating, by the edge, the leading peelable label of the at least one label roll from the outward-facing surface of the backing substrate at the leading portion of the backing substrate of the at least one label roll.

15. The method of claim 14, further comprising positioning the at least one label roll on the label dispenser such that the backing substrate passes over an upper portion of the label guide arm, through the at least one opening, and under a lower portion of the label guide arm.

16. The method of claim 14, wherein the separating of the leading peelable label of the at least one label roll from the outward-facing surface of the backing substrate at the leading portion of the backing substrate of the at least one label roll further comprises the free edge sliding under a leading edge of the leading peelable label to initiate the separating of the leading peelable label of the at least one label roll from the outward-facing surface of the backing substrate.

17. The method of claim 16, wherein in response to an initiation of the separating of the leading peelable label of the at least one label roll from the outward-facing surface of the backing substrate, the leading edge of the leading peelable label slides over a lower portion of the label guide arm.

18. The method of claim 17, wherein the leading peelable label remains attached to the lower portion of the label guide arm after the leading peelable label is fully separated from the outward-facing surface of the backing substrate; and further comprising permitting the user to detach the leading peelable label from the lower portion of the label guide arm by pulling the leading peelable label in a direction away from the lower portion of the label guide arm.

19. The method of claim 14, further comprising permitting the at least one label roll to rotate on the label roll support arm in response to the force applied by the user to the leading portion of the backing substrate of the at least one label roll to pull the leading portion of the backing substrate of the at least one label roll through the at least one opening of the label guide arm.

20. The method of claim 14, wherein:

the label roll support arm is configured as an elongated cylinder that permits the at least one label roll to freely rotate on the label roll support arm;

the elongated cylinder has an incomplete perimeter such that a portion of a circumference of the elongated cylinder is absent to create two opposing top free ends of the circumference and two opposing bottom free ends of the circumference, the top free ends having a first gap therebetween and the bottom free ends having a second gap therebetween; and the inclined distal portion of the support bar passing through the notch passes through the first gap between the top free ends; and further comprising, in response to the force applied by the user to the leading portion of the backing substrate of the at least one label roll to pull the leading portion of the backing substrate of the at least one label roll through the at least one opening of the label guide arm:

restricting forward rotation of the label roll support arm by an abutment of one of the top free ends and a first side of the support bar; and restricting rearward rotation of the label roll support arm by an abutment of another one of the top free ends and a second side of the support bar opposite to the first side.

* * * * *